Patented May 2, 1950

2,506,458

UNITED STATES PATENT OFFICE 2,506,458

PRODUCTION OF ARECOLINE

Lawrence Howland Knox, New York, N. Y., assignor to Nopco Chemical Company, Harrison, N. J., a corporation of New Jersey No Drawing. Application January 24, 1947, Serial No. 724,243

16 Claims. (Cl. 260—294)

This invention relates to the production of arecoline and more particularly to a new process for producing arecoline in a simple and efficient manner from relatively inexpensive starting materials.

At the present time arecoline is obtained commercially by the extraction of betel nuts to recover the alkaloids therein. The arecoline which is obtained is used for various purposes and particularly by veterinarians as an anthelmintic. Although there is a considerable demand for this compound, as yet, no practical commercial method of producing it synthetically has been developed.

One chemical synthesis which has been proposed (Hesse and Liebbrandt, Ber. 51, 806 (1918)) involves the reduction of the methyl ester of nicotinic acid to produce 3-carbomethoxy piperidine; this compound is then methylated to produce 1-methyl-3-carbomethoxy piperidine which is then brominated at the 3-position and thereafter hydrogen from the 4-position and the bromine from the 3-position are split off as hydrogen bromide, thus giving arecoline as the final product. This process is rather involved as it leads to a mixture of ester, the free acid aracaidine, and bromine substitution products; consequently the yield of arecoline is rather low. An earlier synthesis of arecoline (Wohl and Johnson, Ber. 40, 4712 (1907)) involved the condensation of β-methyl-iminodipropaldehyde to give arecaidine aldehyde which was then converted into arecoline. Since the only difference between the latter two compounds is in the presence of a CHO group and a carbomethoxy group, respectively, in the three-position, one might expect that the aldehyde group could very easily be oxidized to the carboxyl group and the resulting acid then esterified with methyl alcohol to produce arecoline. However, if one attempts to oxidize this aldehyde group, the ring structure of the compound is destroyed. Consequently, in order to obtain arecoline from the aracaidine aldehyde, it is necessary to carry out a rather long and involved synthesis. First, the aldehyde is reacted with hydroxylamine, then the resulting oxime is dehydrated to give the corresponding nitrile, the nitrile is then hydrolyzed to produce aracaidine, and finally the aracaidine is esterified with methyl alcohol to give arecoline. Another synthesis of arecoline, and the most recently reported (Mannich, Ber. 75B, 1480 (1942)), employs methylamine hydrochloride and formaldehyde to obtain aracaidine aldehyde which is then converted to arecoline by the same involved synthesis as is used in the earlier case.

It is the object of this invention to provide a new process for producing arecoline.

Another object of the invention is to provide a commercially practicable process for the production of arecoline.

A further object of the invention is to utilize a by-product of the synthesis of β-alanine to produce arecoline.

Other objects of the invention will in part be obvious and will in part appear hereinafter.

I have dicsovered that arecoline may be very readily synthesized employing as the initial starting material the compound bis-(β-cyanoethyl)-amine which is a by-product in the production of β-alanine. In carrying out the production of arecoline from this compound the amine compound is first converted into a tertiary amine by methylation with formaldehyde and formic acid, thus giving bis-(β-cyanoethyl)-methylamine. In the next step of the process the bis-(β-cyanoethyl)-methylamine is converted to bis-(β-carbomethoxy-ethyl)-methylamine or to the corresponding carbethoxy compound by reaction with acidified methanol or acidified ethanol, respectively. In this reaction the two cyano groups are each converted into a carbomethoxy or carbethoxy group, respectively, by means of an alcoholysis reaction. Whichever compound is produced is next treated with an alkaline condensing agent in the presence of a solvent to give 1-methyl-3-carbomethoxy-4-piperidone and methanol or 1-methyl-3-carbethoxy-4-piperidone and ethanol, respectively. The piperidone compound is then reduced to the corresponding 4-hydroxy-piperidine by treatment with hydrogen in the presence of a catalyst. In the final step of the process this hydroxy-piperidine compound is dehydrated to give in the first case arecoline and in the second case homo-arecoline which may readily be converted to arecoline by replacing the ethyl radical of the carbethoxy group with a methyl radical by any suitable means, e. g. by hydrolysis and then re-esterification with methanol, or by an ester interchange.

In carrying out the first step of the process, the bis-(β-cyanoethyl) amine which is employed may be the crude material which is obtained as a by-product in the production of β-alanine or, if desired, the crude material may first be purified by distillation or other suitable means before it is used in the process. Obviously the source of the bis-(β-cyanoethyl) amine is immaterial and it may be obtained from any desired source. In carrying out the methylation of bis-(β-cyanoethyl)-amine, it is reacted with approximately equimolecular quantities of aqueous formadlehyde and formic acid by heating the reactants together for a suitable period of time, e. g. 7 to 8 hours, at a convenient temperature, e. g. from 60 to 100° C., to bring about the desired reaction. When the methylation is completed the water contained in the reaction mixture is evaporated, preferably by heating the mixture on a steam bath under reduced pressure. In order to prevent loss of the methylamine derivative during this concentration step it is advisable to add to the reaction mass a sufficient quantity of hydrochloric acid to convert the amine into the hydrochloride salt. The hydrochloride salt of the amine is non-volatile and thus any likelihood of the amine being distilled over with the water which is being removed is eliminated. If desired, sulfuric acid may be similarly employed in place of the hydrochloric acid. The above reaction may be illustrated as follows:

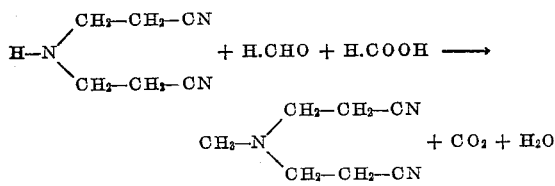

Following the methylation step of my process the bis-(β-cyanoethyl)-methylamine is treated with 20% absolute methanolic or ethanolic HCl in an amount equal to about 5 to 6 times the weight of the amine. In carrying out this step of the process it is not necessary to isolate the bis-(β-cyanoethyl)-methylamine following its production in the previous step and thus, if desired, the reaction mass after having been freed of water in the first step may then be treated in accordance with the second step of the process. If desired, of course, the bis-(β-cyanoethyl)-methylamine may be isolated following the methylation step and prior to the treatment with the methanolic or ethanolic HCl. In the second step of the process the two cyano groups contained in bis-(β-cyanoethyl)-methylamine are converted by alcoholysis to carbomethoxy groups when methanol is employed, and to carbethoxy groups when ethanol is employed, thus converting the bis-(β-cyanotheyl)-methylamine into bis-(β-carbomethoxyethyl)-methylamine or bis-(β-carbethoxyethyl)-methylamine, respectively. Although it is preferred to use hydrochloric acid in this step, other mineral acids, e. g. sulfuric acid, may be substituted therefor. This reaction may be illustrated as follows, R being either ethyl or methyl:

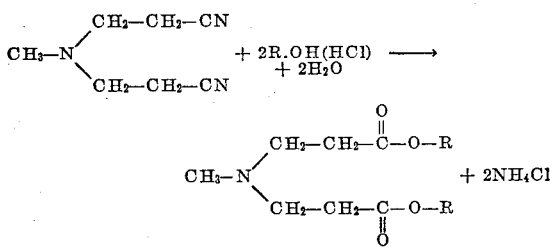

In carrying out the condensation step of my process, the condensation of the bis-(β-carbomethoxyethyl-methylamine or bis-(β-carbethoxyethyl)-methylamine is carried out in an inert solvent, preferably naphtha, in the presence of an alkaline condensing agent such as metallic sodium, potassium or lithium, sodium methoxide, potassium methoxide, lithium methoxide, sodium ethoxide, potassium ethoxide, lithium ethoxide, sodium amide, potassium amide, lithium amide, sodium hydride, potassium hydride, lithium hydride, and similar compounds of the other alkali metals, etc., and the mixture heated so that the methanol or ethanol which is split out, as illustrated in the following reaction, distills over.

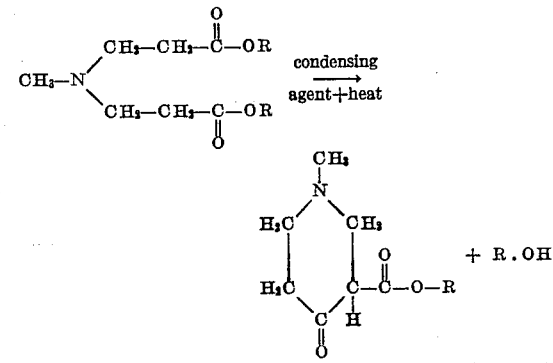

A mole per mole ratio, or at least approximately so, of the condensing agent and the bis-(β-carbalkoxyethyl)-methylamine is employed. The distillation is continued until the methanol or ethanol, as the case may be, ceases to come over. If naphtha has been employed as the solvent medium and methanol is the alcohol being split out, the distillate at first consists largely of methanol which is immiscible with the small amount of naphtha that co-distills with it. Thus in such a case the completion of the reaction is readily apparent since when methanol ceases to distill over, the distillate no longer separates into two layers. Also at this point the temperature rapidly rises to the boiling point of the solvent naphtha employed. If ethanol is the alcohol being split out in the condensation process or if a solvent miscible with methanol is employed, completion of the reaction may be determined by observing the refractive index of the distillate. As the last of the alcohol is distilled over, the refractive index of the distillate will, of course, coincide with that of the solvent being employed. Also as the last of the alcohol distills over, the temperature will quickly rise to the boiling point of the solvent. It is preferred to employ a naphtha having a boiling point range between 100° C. and 150° C. In place of naphtha, solvents such as toluene, xylene, benzene, etc. may be employed; however, these aromatic type solvents are not nearly as satisfactory since their use in the condensation step leads to the production of varying amounts of resinous products and decreases the yield of the desired cyclic keto ester. Furthermore, methanol is miscible with such solvents and therefore when such solvents are used it is more difficult to determine when the reaction has been completed when methanol is the alcohol being distilled over than is the case when naphtha is used as the solvent. Aliphatic hydrocarbon solvents similar to naphtha may, of course, be substituted therefor, if desired. When all the alcohol has been removed from the reaction mixture, the reaction mixture is allowed to cool and the insoluble sodium enolate which separates, i. e. when sodium or a sodium compound has been employed as the alkaline condensing agent, is removed by filtration and dissolved in cold water, employing about one liter of water per mole of the condensed compound. This solution is then acidified to convert the sodium enolate into 1-methyl-3-carbomethoxy-4-piperdone or 1-methyl-3-carbethoxy-4-piperidone, respectively. This acidified solution is neutralized with a weak base, e. g. sodium or potassium carbonate, and then extracted with chloroform until a negative $FeCl_3$ test is obtained. The $FeCl_3$ will give a violet coloration if any piperidone compound is still present. This is the well known test for compounds which exhibit keto-enol tautomerism. The chloroform solution is then dried, preferably over anhydrous potassium carbonate, the bulk of the solvent removed and the residue taken up in ether and treated with dry HCl to give 1-methyl - 3 - carbomethoxy-4-piperidone hydrochloride or 1-methyl-3-carbethoxy-4-piperidone hydrochloride, respectively. It is preferred to convert the piperidone compound to the hydrochloride salt thereof since this compound is more easily handled in the next step of the process than is the free base. Furthermore, the free base is not a stable compound as it tends to undergo internal salt formation which reaction is not reversible. The hydrochloride salt which precipitates from the ether solution is sufficiently pure to be used in the next step of the process, i. e. the reduction step. In place of ether, chlorinated hydrocarbon solvents, e. g. chloroform, may be employed in converting the piperidone compound to the hydrochloride salt.

In carrying out the reduction of the piperidone compound, the compound is dissolved in methanol or ethanol and subjected to hydrogenation in the presence of Adams' platinum oxide catalyst (this may be purchased from the American Platinum Works of Newark, New Jersey) under a pressure of about 40 lbs. per square inch of hydrogen, although higher hydrogen pressures may be employed if desired. (Adams' platinum oxide catalyst is a well-known hydrogenation catalyst developed by Roger Adams and co-workers at the University of Illinois. The chemical composition of this catalyst is $PtO_2.H_2O$. Detailed procedures for preparing this catalyst are given on pages 463–470 of "Organic Syntheses," Collective volume I, second edition, edited by A. H. Blatt and published in 1941 by John Wiley and Sons, Inc. of New York. Methods for preparing this well-known catalyst may also be found on pages 14 and 15 of "Organic Preparations" by Weygand, published in 1945 by Interscience Publishers, Inc. of New York.) In order to speed up this reaction and greatly reduce the amount of platinum oxide required, a small amount of a free inorganic base, e. g. any one of the bases suitable for use as a condensing agent in the previous step, is added to the alcohol solution of the piperidone hydrochloride in order to release a small amount of the free organic base. Just a very small amount of the free inorganic base gives excellent results. Usually from 0.03 to 0.10 of a mole of the inorganic base per mole of piperidone is quite sufficient. Of course, if desired, a small amount of the free piperidone may itself be added to the alcohol solution. The exact manner in which the free base aids in bringing about the hydrogenation in such an improved manner has as yet not been determined, and therefore I do not wish to be bound to any particular theory in explanation of this phenomenon. Regardless of the reason therefor, I have discovered that by carrying out the reduction as described above, the process can be carried out far more efficiently and much less expensively than ever before. However, it appears that the presence of such a small amount of the free organic base either acts as a catalyst or greatly enhances the catalytic effect of the platinum oxide. As the reduction reaction proceeds the small amount of free piperidone is, of course, converted to the corresponding piperidine compound. Thus during the reaction there will be present a small amount of a mixture of the free piperidone and the free piperidine with the piperidone all having been reduced at the completion of the reaction. When the process is carried out in this manner, the time of reaction may be reduced from 50 hours down to as low as 6 hours and at the same time the amount of platinum oxide which is employed may be reduced to as low as 1/20 of the amount which would otherwise be required. When reduction of the 4-piperidone derivative is complete, a drop of the reaction mixture gives no coloration with ferric chloride. Reduction converts the 4-piperidone hydrochloride derivative to the corresponding 4-hydroxy-piperidine hydrochloride derivative. This reaction may be illustrated as follows:

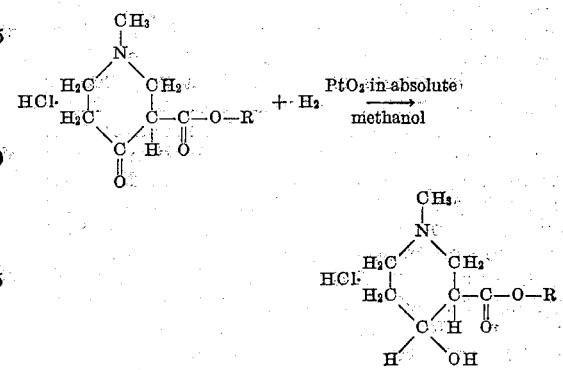

In the next step of the process the 4-hydroxy-piperidine hydrochloride is dehydrated by treatment with a compound such as thionylchloride or phosphorus oxychloride. In this reaction the hydroxy group from the 4-position and the hydrogen from the 3-position are split off, thus giving rise to a double bond between the 3-position and the 4-position. If 1-methyl-3-carbomethoxy - 4 - hydroxy - piperidine hydrochloride was the compound dehydrated, the product will be the hydrochloride salt of arecoline (methyl 1-methyl-Δ-3, 4-tetrahydropyridine-3-carboxylate). On the other hand, if the compound dehydrated was the corresponding carbethoxy-piperidine, the product will be the hydrochloride salt of homo-arecoline (ethyl ester of aracaidine). This product may readily be converted to arecoline by hydrolysis to the free acid (aracaidine) and reesterification with methanol by any of the well known methods. An outstanding feature of this step of the process is the fact that the dehydration is carried out in the absence of any solvent. It has always been believed to be necessary in such dehydration reactions to dissolve the compound being treated in an inert solvent prior to the addition of the dehydrating agent; however, I have found that with the compounds being treated by the process of my invention, dehydration may be carried out by the addition of one of the dehydrating agents listed above to the compound to be dehydrated in complete absence of solvent, and furthermore the results obtained are far superior to those given by processes used heretofore. The hydroxy piperidine hydrochloride salts which are to be dehydrated may be warmed slightly on a steam bath and the dehydrating agent then slowly added with stirring. When the reaction has been completed, which will be readily apparent since the evolution of HCl gas will cease on completion of the reaction, the mass is cooled, dissolved in cold water and neutralized with a weak base; the arecoline or homo-arecoline, as the case may be, is then extracted from the aqueous solution with chloroform. The solvent is then removed by distillation and the residual oil distilled under reduced pressure to give the crude alkaloid. If homo-arecoline has been produced, it may be converted to arecoline as described above at any convenient point following the dehydration; or, if desired, the ethyl group may be replaced with the methyl group at any point after the condensation step of my process. It is preferred to employ either thionyl chloride or phosphorus oxychloride as the dehydrating agent, and to carry out the dehydration in the absence of a solvent for the piperidine compound. However, if desired, other dehydrating agents may be employed, such as, for example, concentrated hydrochloric acid, a mixture of acetic acid and concentrated hydrochloric acid, concentrated hydrobromic acid, etc. However, these dehydrating agents must be used in amounts in excess of the amount required for dehydration with the excess amount serving as a solvent medium in which the reaction takes place. Also if desired the dehydration may be carried out by dissolving the free piperidine compound in an inert solvent, such as, for example, pyridine, aromatic hydrocarbon solvents such as benzene and toluene, aliphatic hydrocarbon solvents such as naphtha, hexane, etc., and then adding the dehydrating agent to this solvent solution. However, the preferred procedure employing the preferred dehydrating agents gives far superior results as compared to the alternative procedures. The alternative procedures give comparatively low yields, and in many cases the carbalkoxy group at the 3-position of the piperidone compound is hydrolyzed to the free acid. When that happens, it is necessary to isolate the acid compound and then re-esterify it with methanol which, of course, increases the cost of the process and the time required to carry it out.

Pure arecoline may be isolated as the hydrobromide salt from the distillate comprising the crude alkaloid. This may be done by dissolving the crude arecoline in a low molecular weight monohydroxy alcohol, e. g. methanol, ethanol, isopropanol, butanol, amyl alcohol, etc. of which I prefer to employ ethanol, and adding sufficient 50% absolute ethanolic HBr to give a weakly acidic solution. This solution is then allowed to stand for about a day at a low temperature, e. g., approximately 0° C. The arecoline hydrobromide, which has a melting point of 170° C., crystallizes and may be separated from the alcohol by filtration. In animal therapy the arecoline is employed as the hydrobromide salt, which is a further reason for converting it to this compound.

For a fuller understanding of the nature and objects of this invention, reference may be had to the following example which is merely illustrative of the invention and is not to be construed in a limiting sense:

*Example I*

1000 grams of crude bis-($\beta$-cyanoethyl)-amine were reacted with 610 cc. of 40% aqueous formaldehyde and 1 liter of 90% formic acid. The reaction mixture was heated on a steam bath for approximately 7 hours and then 1 liter of concentrated hydrochloric acid was added. The reaction mixture was then freed of water by heating on the steam bath under a reduced pressure of approximately 30 mm. The water-free oil which contained bis-($\beta$-cyanoethyl)-methylamine hydrochloride was then dissolved in 2700 cc. of absolute methanol and this solution treated with 2700 cc. of absolute methanol containing 1400 grams of dry HCl which solution had been cooled to a temperature of about 10° C. Considerable heat was evolved during the alcoholysis reaction; the reaction was allowed to continue until complete as evidenced by the cessation of further heat. The reaction mass was concentrated to one-half its original volume by distillation on a steam bath under reduced pressure, allowed to cool, and then treated with 1600 cc. of 50% aqueous potassium carbonate. The free ester thus liberated was then extracted with chloroform employing a total of about 4 liters of the solvent. The chloroform was then removed from the solvent solution by distillation and the residual oil distilled under reduced pressure to give bis - ($\beta$-carbomethoxyethyl) - methylamine. One mole of the methylamine derivative was then dissolved in approximately 1½ liters of dry naphtha (B. P. 115-148° C.) containing one mole of sodium methoxide. This mixture was then heated and the methanol, which was split out in the condensation reaction, was distilled out. The heating was continued until the reaction was completed as evidenced by the distilling over of the naphtha free of methanol. This was readily shown, as described hereinabove, by the absence of two phases in the distillate at this point since the naphtha and methanol are immiscible. The reaction mixture was allowed to cool and the insoluble sodium enolate which separated was then dissolved in approximately a liter of cold water and acidified to Congo paper with concentrated hydrochloric acid to convert it into the free piperidone. The acid solution was then neutralized with solid potassium carbonate and the piperidone extracted with chloroform. Extraction was continued until a few drops of the extract gave no coloration with ferric chloride thus indicating that all the piperidone had been removed from the aqueous solution. The chloroform solution was dried over anhydrous potassium carbonate, the desiccant filtered off, and the bulk of the solvent then removed by distillation and the residue taken up in ether. The ether solution was then treated with dry HCl whereupon the hydrochloride salt of the piperidone precipitated. This salt had a melting point of from 174 to 179° C. and was sufficiently pure for use in the reduction step. 100 grams of the hydrochloride salt were dissolved in 600 cc. of absolute methanol containing 5 grams of platinum oxide, and approximately 1/20 of a mole of sodium methoxide was added thereto. This solution was then subjected to a hydrogen pressure of 4 to 5 atmospheres at room temperature for 8 hours while being continuously agitated. At the end of this time the piperidone had been converted to the corresponding 4-hydroxy-piperidine. This hydroxy-piperidine was recovered from the methanol solution by complete removal of the methanol by distillation under reduced pressure, and it was then dehydrated by adding thereto approximately 60 grams of thionyl chloride dropwise with stirring on a steam bath. When the reaction was completed the mass was cooled, dissolved in cold water, neutralized with potassium carbonate, the arecoline extracted from the aqueous solution with chloroform, the chloroform removed from the solvent solution by distillation and the residual oil which was obtained distilled under reduced pressure to give a mixture of arecoline and its Δ-4,5-isomer. Another sample of the 4-hydroxy-piperidine was similarly converted to arecoline except that phosphorus oxychloride was employed as the dehydrating agent. The hydrobromide salt of arecoline was isolated from the crude mixture of arecoline and its Δ-4,5-isomer in both instances by dissolving the crude mixture in absolute ethanol employing approximately 250 cc. of ethanol per each 100 grams of crude alkaloid, adding 50% absolute ethanolic HBr until the solution was weakly acidic and then allowing the solution to stand for 24 hours in a refrigerator at a temperature of about 3° C. The arecoline hydrobromide precipitated from the solution and was readily separated by filtration. This salt, which had a melting point of 170° C., was very pure and was quite suitable for any use to which the naturally occurring arecoline obtained from betel nuts is adapted.

Having described my invention, what I claim as new and desire to secure by Letters Patent is:

1. In a process for the production of arecoline, the steps comprising reacting bis-(β-cyanoethyl)-amine with formic acid and formaldehyde to produce bis-(β-cyanoethyl)-methylamine, converting the bis-(β-cyanoethyl)-methylamine to a bis-(β-carbalkoxyethyl)-methylamine by reacting it with an alcohol selected from the group consisting of methanol and ethanol, condensing the ester thus obtained to give a 1-methyl-3-carbalkoxy-4-piperidone, hydrogenating this compound in the presence of a small amount of a free organic base selected from the group consisting of piperidones and piperidines to give the corresponding 4-hydroxy-piperidine, and dehydrating the 4-hydroxy-piperidine thus produced by contacting the piperidine compound with a compound selected from the group consisting of thionyl chloride and phosphorus oxychloride in the absence of a solvent for the piperidine compound.

2. In a process for the production of arecoline, the steps comprising reacting bis-(β-cyanoethyl)-amine with formic acid and formaldehyde to produce bis-(β-cyanoethyl)-methylamine, converting the bis-(β-cyanoethyl)-methylamine to a bis-(β-carbalkoxyethyl)-methylamine by reacting it with an alcohol selected from the group consisting of methanol and ethanol, condensing the ester thus obtained by heating it in the presence of an alkaline condensing agent selected from the group consisting of the alkali metals, their alkoxides, amides, and hydrides, to give a 1-methyl-3-carbalkoxy-4-piperidone, hydrogenating this compound in the presence of a small amount of a free organic base selected from the group consisting of piperidones and piperidines, to give the corresponding 4-hydroxy-piperidine, and dehydrating the 4-hydroxy-piperidine thus produced by contacting the piperidine compound with a compound selected from the group consisting of thionyl chloride and phosphorus oxychloride in the absence of a solvent for the piperidine compound.

3. In a process for the production of arecoline, the steps comprising reacting bis-(β-cyanoethyl)-amine with formic acid and formaldehyde to produce bis-(β-cyanoethyl)-methylamine, converting the bis-(β-cyanoethyl)-methylamine to a bis-(β-carbalkoxyethyl)-methylamine by reacting it with an alcohol selected from the group consisting of methanol and ethanol, said alcohol containing approximately 20% of an anhydrous acid selected from the group consisting of hydrochloric acid and sulfuric acid, condensing the ester thus obtained by heating it in a hydrocarbon solvent in the presence of an alkaline condensing agent selected from the group consisting of the alkali metals, their alkoxides, amides, and hydrides, to give a 1-methyl-3-carbalkoxy-4-piperidone, converting the free piperidone to the hydrochloride salt thereof, reducing this compound by hydrogenation in the presence of a small amount of a free organic base selected from the group consisting of piperidones and piperidines, and in the presence of Adams' platinum oxide catalyst to give the corresponding 4-hydroxy-piperidine, and dehydrating the hydrochloride salt of the 4-hydroxy-piperidine by contacting it with a compound selected from the group consisting of thionyl chloride and phosphorous oxychloride in the absence of a solvent for the piperidine compound.

4. The dehydration of a 1-methyl-3-carbalkoxy-4-hydroxy-piperidine to give a 1-methyl-3-carbalkoxy-Δ-3,4-piperidine wherein said dehydration is carried out by contacting the hydrochloride salt of the 4-hydroxy-piperidine with a compound selected from the group consisting of thionyl chloride and phosphorus oxychloride in the absence of a solvent for the 4-hydroxy-piperidine compound.

5. The reduction of a 1-methyl-3-carbalkoxy-4-piperidone wherein the free piperidone is converted to the hydrochloride salt thereof, the salt dissolved in a solvent selected from the group consisting of methanol and ethanol, and the salt of the piperidone contacted with hydrogen under pressure in the presence of Adams' platinum oxide catalyst and a small amount of a free organic base selected from the group consisting of piperidones and piperidines.

6. The reduction of a 1-methyl-3-carbalkoxy-4-piperidone wherein the free piperidone is converted to the hydrochloride salt thereof, the salt dissolved in a solvent selected from the group consisting of methanol and ethanol, a small amount of the hydrochloride salt of the piperidone is converted to the free organic base by reaction with an inorganic base, and the solvent solution thereafter contacted with hydrogen under pressure in the presence of Adams' platinum oxide catalyst.

7. In a process for the production of arecoline, the steps comprising reacting bis-(β-cyanoethyl)-amine with formic acid and formaldehyde to produce bis-(β-cyanoethyl)-methylamine, reacting the bis-(β-cyanoethyl)-methylamine thus obtained with methanol to give bis-(β-carbomethoxyethyl)-methylamine, condensing this ester to give 1-methyl-3-carbomethoxy-4-piperidone, hydrogenating the piperidone compound in the presence of a small amount of a free organic base selected from the group consisting of piperidones and piperidines to give 1-methyl-3-carbomethoxy-4-hydroxy-piperidine, and dehydrating the piperidine compound to give arecoline by contacting the piperidine compound with a compound selected from the group consisting of thionyl chloride and phosphorus oxychloride in the absence of a solvent for the piperidine compound.

8. In a process for the production of arecoline, the steps comprising reacting bis-(β-cyanoethyl)-amine with formic acid and formaldehyde to produce bis-(β-cyanoethyl)-methylamine, reacting the bis-(β-cyanoethyl)-methylamine thus obtained with methanol to give bis-(β-carbomethoxyethyl)-methylamine, condensing this ester by heating it in the presence of an alkaline condensing agent selected from the group consisting of the alkali metals, their alkoxides, amides, and hydrides, to give 1-methyl-3-carbomethoxy-4-piperidone, hydrogenating the piperidone compound in the presence of a small amount of a free organic base selected from the group consisting of piperidones and piperidines to give 1-methyl-3-carbomethoxy-4-hydroxy-piperidine, and dehydrating the piperidine compound to give arecoline by contacting the piperidine compound with a compound selected from the group consisting of thionyl chloride and phosphorus oxychloride in the absence of a solvent for the piperidine compound.

9. In a process for the production of arecoline, the steps comprising reacting bis-(β-cyanoethyl)-amine with formic acid and formaldehyde to produce bis-(β-cyanoethyl)-methylamine, converting the bis-(β-cyanoethyl)-methylamine to bis-(β-carbomethoxyethyl)-methylamine by reacting it with methanol containing approximately 20% of an anhydrous acid selected from the group consisting of hydrochloric acid and sulfuric acid, condensing the ester thus obtained by heating it in a hydrocarbon solvent in the presence of an alkaline condensing agent selected from the group consisting of the alkali metals, their alkoxides, amides, and hydrides, to give 1-methyl-3-carbomethoxy-4-piperidone, converting the free piperidone to the hydrochloride salt thereof, reducing this compound by hydrogenation in the presence of a small amount of a free organic base selected from the group consisting of piperidones and piperidines, and in the presence of Adams' platinum oxide catalyst to give the corresponding 4-hydroxy-piperidine, and dehydrating the hydrochloride salt of the 4-hydroxy-piperidine by contacting it with a compound selected from the group consisting of thionyl chloride and phosphorus oxychloride in the absence of a solvent for the piperidine compound.

10. In a process for the production of arecoline, the steps comprising reacting bis-(β-cyanoethyl)-amine with formic acid and formaldehyde to produce bis-(β-cyanoethyl)-methylamine, converting the bis-(β-cyanoethyl)-methylamine to bis-(β-carbomethoxyethyl)-methylamine by reacting it with methanol containing approximately 20% of an anhydrous acid selected from the group consisting of hydrochloric acid and sulfuric acid, condensing the ester thus obtained by heating it in a hydrocarbon solvent in the presence of an alkaline condensing agent selected from the group consisting of the alkali metals, their alkoxides, amides, and hydrides, to give 1-methyl-3-carbomethoxy-4-piperidone, converting the free piperidone to the hydrochloride salt thereof, dissolving this salt in a solvent selected from the group consisting of methanol and ethanol, contacting the solution of the piperidone salt with hydrogen under pressure in the presence of Adams' platinum oxide catalyst and a small amount of 1-methyl-3-carbomethoxy-4-piperidone, and dehydrating the 1-methyl-3-carbomethoxy-4-hydroxy-piperidine thus produced to give arecoline by contacting the hydrochloride salt of the 1-methyl-3-carbomethoxy-4-hydroxy-piperidine with a compound selected from the group consisting of thionyl chloride and phosphorus oxychloride in the absence of a solvent for the 1-methyl-3-carbomethoxy-4-hydroxy-piperidine hydrochloride.

11. A process comprising reacting bis-(β-cyanoethyl)-amine with formic acid and formaldehyde to produce bis-(β-cyanoethyl)-methylamine, converting the bis-(β-cyanoethyl)-methylamine to bis-(β-carbethoxyethyl)-methylamine by reacting it with ethanol containing approximately 20% of an anhydrous acid selected from the group consisting of hydrochloric acid and sulfuric acid, condensing the ester thus obtained by heating it in a hydrocarbon solvent in the presence of an alkaline condensing agent selected from the group consisting of the alkali metals, their alkoxides, amides, and hydrides, to give 1-methyl-3-carbethoxy-4-piperidone, converting the free piperidone to the hydrochloride salt thereof, dissolving this salt in a solvent selected from the group consisting of methanol and ethanol, contacting the solution of the piperidone salt with hydrogen under pressure in the presence of a small amount of a free organic base selected from the group consisting of piperidones and piperidines, and in the presence of Adams' platinum oxide catalyst, and dehydrating the 1-methyl-3-carbethoxy-4-hydroxy-piperidine thus produced to give homo-arecoline by contacting the hydrochloride salt of the 1-methyl-3-carbethoxy-4-hydroxy-piperidine with a compound selected from the group consisting of thionyl chloride and phosphorus oxychloride in the absence of a solvent for the 1-methyl-3-carbethoxy-4-hydroxy-piperidine hydrochloride.

12. A process for the production of arecoline comprising producing homo-arecoline by the process of claim 10, hydrolyzing the homo-arecoline thus produced to give aracaidine, and reacting the arecaidine with methanol to give arecoline.

13. A process for the production of arecoline comprising reacting bis-(β-cyanoethyl)-amine with formic acid and formaldehyde to produce bis-(β-cyanoethyl)-methylamine, converting the bis-(β-cyanoethyl)-methylamine to the bis-(β-carbomethoxyethyl)-methylamine by reacting it with methanol containing approximately 20% of anhydrous HCl, condensing the ester compound thus obtained by heating it in dry naphtha in the presence of sodium methoxide to give 1-methyl-3-carbomethoxy-4-piperidone, converting the free piperidone to its hydrochloride salt, dissolving the hydrochloride salt in methanol, contacting a small amount of an inorganic base with the hydrochloride salt of the piperidone in the methanol, contacting the methanol solution with hydrogen under pressure in the presence of Adams' platinum oxide catalyst, and dehydrating the 1-methyl-3-carbomethoxy-4-hydroxy-piperidine thus produced to give arecoline by contacting the hydrochloride salt of the 1-methyl-3-carbomethoxy-4-hydroxy-piperidine with a compound selected from the group consisting of thionyl chloride and phosphorus oxychloride in the absence of a solvent for the 1-methyl-3-carbomethoxy-4-hydroxy-piperidine hydrochloride.

14. The dehydration of 1-methyl-3-carbomethoxy-4-hydroxy-piperidine to give 1-methyl-3-carbomethoxy-Δ-3,4-piperidine wherein said dehydration is carried out by contacting the hydrochloride salt of the 4-hydroxy-piperidine with a compound selected from the group consisting of thionyl chloride and phosphorus oxychloride in the absence of a solvent for the 4-hydroxy-piperidine compound.

15. The dehydration of 1-methyl-3-carbethoxy-4-hydroxy-piperidine to give 1-methyl-3-carbethoxy-Δ-3,4-piperidine wherein said dehydration is carried out by contacting the hydrochloride salt of the 4-hydroxy piperidine with a compound selected from the group consisting of thionyl chloride and phosphorus oxychloride in the absence of a solvent for the 4-hydroxy-piperidine compound.

16. In a process for the production of arecoline, the steps comprising reacting bis-(β-cyanoethyl)-amine with formic acid and formaldehyde to produce bis-(β-cyanoethyl)-methylamine, converting the bis-(β-cyanoethyl)-methylamine to bis-(β-carbomethoxyethyl)-methylamine by reacting it with methanol containing approximately 20% of an anhydrous acid selected from the group consisting of hydrochloric acid and sulfuric acid, condensing the ester thus obtained by heating it in a hydrocarbon solvent in the presence of an alkaline condensing agent selected from the group consisting of the alkali metals their alkoxides, amides, and hydrides, to give 1-methyl-3-carbomethoxy-4-piperidone, converting the free piperidone to the hydrochloride salt thereof, dissolving this salt in a solvent selected from the group consisting of methanol and ethanol, contacting the solution of the piperidone salt with hydrogen under pressure in the presence of Adams' platinum oxide catalyst and a small amount of 1-methyl-3-carbomethoxy-4-hydroxy-piperidine, and dehydrating the 1-methyl-3-carbomethoxy-4-hydroxy-piperidine thus produced to give arecoline by contacting the hydrochloride salt of the 1-methyl-3-carbomethoxy-4-hydroxy-piperidine with a compound selected from the group consisting of thionyl chloride and phosphorus oxychloride in the absence of a solvent for the 1-methyl-3-carbomethoxy-4-hydroxy-piperidine hydrochloride.

LAWRENCE HOWLAND KNOX.

REFERENCES CITED

The following references are of record in the file of this patent:

FOREIGN PATENTS

| Number | Country | Date |
|--------|---------|------|
| 485,139 | Germany | 1930 |

OTHER REFERENCES

Dankova Chem. Abstracts, vol. 37 (1943) p. 381.
Ugryumov Chem. Abstracts, vol. 35, p. 3644.
Karrer, "Organic Chemistry," 2nd edition, p. 825.